(12) United States Patent
Shankar et al.

(10) Patent No.: US 7,577,633 B2
(45) Date of Patent: Aug. 18, 2009

(54) SELF LEARNING EVENT PARSER

(75) Inventors: Sanjeev Shankar, Waterloo (CA); Chris Thiessen, Cambridge (CA); Michael Corke, Guelph (CA); Chris Gordon, Waterloo (CA); Andrew Selkirk, Kitchener (CA); Alan Lefort, Kitchener (CA)

(73) Assignee: Intellitactics Inc., Ontario (CA)

( * ) Notice: Subject to any disclaimer, the term of this patent is extended or adjusted under 35 U.S.C. 154(b) by 359 days.

(21) Appl. No.: 11/633,627

(22) Filed: Dec. 5, 2006

(65) Prior Publication Data

US 2007/0169038 A1 Jul. 19, 2007

Related U.S. Application Data

(60) Provisional application No. 60/748,157, filed on Dec. 8, 2005.

(51) Int. Cl.
  *G06F 17/00* (2006.01)
  *G06N 5/02* (2006.01)
(52) U.S. Cl. ............................................. 706/48
(58) Field of Classification Search .................. 706/48
  See application file for complete search history.

(56) References Cited

U.S. PATENT DOCUMENTS

| | | | | |
|---|---|---|---|---|
| 5,630,067 | A | | 5/1997 | Kindell et al. |
| 7,055,154 | B2 * | | 5/2006 | Popp et al. ................. 719/315 |
| 7,103,772 | B2 * | | 9/2006 | Jorgensen et al. ........... 713/168 |
| 7,117,436 | B1 * | | 10/2006 | O'Rourke et al. ........... 715/205 |
| 7,139,977 | B1 * | | 11/2006 | Russell ...................... 715/234 |
| 7,178,100 | B2 * | | 2/2007 | Call .......................... 715/210 |
| 7,231,623 | B2 * | | 6/2007 | Miller ......................... 716/11 |
| 7,349,840 | B2 * | | 3/2008 | Budzinski ..................... 704/9 |
| 7,360,087 | B2 * | | 4/2008 | Jorgensen et al. ........... 713/168 |
| 7,386,442 | B2 * | | 6/2008 | Dehlinger et al. ............. 704/10 |
| 7,441,224 | B2 * | | 10/2008 | Bellas et al. .................. 716/16 |
| 7,493,253 | B1 * | | 2/2009 | Ceusters et al. ................ 704/9 |
| 7,523,460 | B2 * | | 4/2009 | Popp et al. ................. 719/315 |
| 7,526,769 | B2 * | | 4/2009 | Watts et al. ................. 719/313 |
| 2004/0128674 | A1 | | 7/2004 | Grabarnik et al. |
| 2007/0003147 | A1 * | | 1/2007 | Viola et al. ................ 382/229 |

OTHER PUBLICATIONS

Multidimensional Incremental Parsing for Universal Source Coding Soo Hyun Bae; Biing-Hwang Juang; Image Processing, IEEE Transactions on vol. 17, Issue 10, Oct. 2008 pp. 1837-1848 Digital Object Identifier 10.1109/TIP.2008.2002308.*

Parsing languages by pattern matching Rus, T.; Software Engineering, IEEE Transactions on vol. 14, Issue 4, Apr. 1988 pp. 498-511 Digital Object Identifier 10.1109/32.4672.*

Dynamic programming parsing for context-free grammars in continuous speech recognition Ney, H.; Signal Processing, IEEE Transactions on [see also Acoustics, Speech, and Signal Processing, IEEE Transactions on] vol. 39, Issue 2, Feb. 1991 pp. 336-340 Digital Object Identifier 10.1109/78.80816.*

(Continued)

*Primary Examiner*—Michael B Holmes
(74) *Attorney, Agent, or Firm*—Morrison & Foerster LLP

(57) ABSTRACT

An adaptive parser capable of automatically reordering expressions such that more commonly matched expressions are tested earlier than less commonly matched expressions; by reordering the expressions in this manner, less frequently matched expressions are less frequently tested, or may not be tested at all, thereby lowering the overall number of tests and increasing the amount of data that can be parsed in a given time period.

53 Claims, 6 Drawing Sheets

OTHER PUBLICATIONS

Parallel parsing algorithms for static dictionary compression Nagumo, H.; Mi Lu; Watson, K.L.; Parallel and Distributed Systems, IEEE Transactions on vol. 10, Issue 12, Dec. 1999 pp. 1241-1251 Digital Object Identifier 10.1109/71.819946.*

D.E. Kruth. (1973). *The Art of Computer Programming* vol. 3, Addison-Wesley, pp. 393-399.

International Search Report and Written Opinion mailed Dec. 14, 2007, directed to counterpart PCT application No. PCT/IB2006/004246.

International Preliminary Report on Patentability and Written Opinion mailed on Jun. 19, 2008 directed towards a counterpart international application; 7 pages.

* cited by examiner

| | |
|---|---|
| 1 | ( ... ) ... ( ... ) ... ( * ) |
| 2 | * ... ( ... ) * ( ... ) ... |
| 3 | ... ( * ) ... ( \... ) .... |
| ⋮ | ⋮ |
| n-3 | ( .. ) . ( .. ) |
| n-2 | ( .. ) |
| n-1 | ( .... ) |
| n | .... ( ... ) .... |

FIG. 1
PRIOR ART

| RANK | | COUNT |
|---|---|---|
| 1 | . . . ( . . . ) . . . | 3 |
| 2 | * ( . . . ) * | 25 |
| 3 | ( . . . ) ( . . . ) | 1 |
| | ⋮ | |
| K | ( . . . ) * ( . . . ) | 24 |
| L | ( . . . ) . . . ( . . . ) | 38 |
| | ⋮ | |
| n-1 | ( . . . * . . . ) | 12 |
| n | ( . . . *) | 0 |

FIG. 3A

| RANK | | COUNT |
|---|---|---|
| 1 | ( . . . ) . . . ( . . . ) | 38 |
| 2 | * ( . . . ) * | 25 |
| 3 | ( . . . ) * ( . . . ) | 24 |
| | ⋮ | |
| K | ( . . . * . . . ) | 12 |
| | ⋮ | |
| n-2 | . . . ( . . . ) . . . | 3 |
| n-1 | ( . . . ) ( . . . ) | 1 |
| n | ( . . . *) | 0 |

FIG. 3B

| RANK | | COUNT |
|---|---|---|
| 1 | ( . . . ) . . . ( . . . ) | |
| 2 | * ( . . . ) * | |
| 3 | ( . . . ) * ( . . . ) | |
| | ⋮ | |
| K | ( . . . * . . . ) | |
| | ⋮ | |
| n-2 | . . . ( . . . ) . . . | |
| n-1 | ( . . . ) ( . . . ) | |
| n | ( . . . *) | |

FIG. 3C

| EXPRESSION | RG1 | RG2 |
|---|---|---|
| ～～～～～ | * | |
| ～～～～～ | * | |
| ～～～～～ | | * |
| | | |
| ～～～ | | |
| ～～～～ | | * |

FIG. 4

WINDOW ORDERING

| $t_0$ | expression | id |
|---|---|---|
| 1 | X ( .xviews) | 1 |
| 2 | \( [0-9][0-9]* ) | 2 |
|   |   |   |
|   |   |   |
|   | \( \. *\) |   |

$twindow_1$

| hr | windowid |
|---|---|
| 1 | 1 |
| 2 | 3 |
| 3 | 2 |
|   |   |
| n | m |

| $t_0$ |   | id |
|---|---|---|
|   | \( [0-9][0-9]* ) | 2 |
|   | \( .xviews ) | 1 |
|   |   |   |
|   |   |   |

$twindow_3$

WINDOW    $t_0$ = START OF WINDOW
$twindow_n$ = END OF WINDOW

FIG. 5

SELF LEARNING EVENT PARSER

CROSS-REFERENCE TO RELATED APPLICATION

This application claims the benefit of U.S. Provisional Application, Ser. No. 60/748,157, filed Dec. 8, 2005.

BACKGROUND OF THE INVENTION

In today's world of technology, businesses are becoming increasingly dependent on the speed at which data can be processed. In the past, businesses were not able to acquire enough data to ensure that they were accurately and thoroughly informed. As the computer age blossomed, however, this problem has disappeared. Instead, businesses are now encountering the opposite problem; too much data is now available, and most of the data is irrelevant for any given purpose. Businesses are now encountering the problem of trying to determine what data is useful and what data is irrelevant.

With this influx of data, businesses have had to develop ways of making sense out of the mountains of data that are gathered. Event parsers are a common tool used for sifting through logged or streamed data to find useful and/or desired events in the data. An event parser works by examining incoming data and looking for known strings of information that are present in the type of data being sought. When a known string of data is found, the parser removes the known string, and/or a portion of data near the known string, and stores the removed data for analysis while ignoring or discarding the unwanted portions of the data. While parsers are an excellent way of finding useful data, they are somewhat cumbersome in that the speed at which they can analyze data is greatly affected by the configuration of the data to be analyzed and by the configuration of the parsers themselves.

In order to maximize the efficiency of the parsers, parser designers are often required to customize each parser for the specific application for which it is intended to be used, this can often involve travel to the site where the parser is used in order to configure the parser according to the configuration of the data to be analyzed. Such individual configurations can be costly for all of the parties involved as well as time consuming and inefficient. Furthermore, if the configuration of the data is changed, a technician is often required to reconfigure the parser to improve its efficiency.

Logged event data can be generated from a wide variety of sources, and each source is generally optimized and configured in a unique format depending upon the environment in which it is used. Parsers parse and normalize data (such as logged or streamed data) using methods and/or systems in which parse grammars are defined. Such grammars usually analyze event data by attempting to match events in the data to a specific predefined data expressions or definitions. As depicted in Prior Art FIG. 1, these expressions are commonly stored and compared in a hierarchical structure starting with the most specific grammars and progressing down the hierarchy through the less specific grammars towards the most generic grammars until a match is determined. Such systems can be very inefficient as data must be compared to the each expression until it is matched; if most of the data is matched to expressions not near the top of the hierarchy, time is wasted by comparing the data to the most specific grammars. Such schemes can also result in the loss of useful information if generic grammars are mistakenly placed above specific grammars in a hierarchy.

In some cases, only generic parse grammars are used, however, in these cases the derived meta data regarding each event is scanty and of limited value. Accordingly, in order to increase the usefulness of a parser it is beneficial to match as many events as possible to specific grammars. Configuring a parser to match specific grammars is a time consuming and error prone process.

SUMMARY OF THE INVENTION

According to various embodiments of the invention, a method of parsing data may include, receiving the data at a parsing unit, wherein the data comprises a plurality of expressions; comparing at least one of the expressions in the data to at least one of a plurality of known expressions stored in an ordered list, wherein the at least one expression is compared to a first known expression in the ordered list and, if the at least one expression does not match the first known expression, the at least one expression is compared to subsequent known expressions in an order in which they are stored in the ordered list until the at least one expression is matched to a known expression, or until it is determined that the at least one expression does not match any of the known expressions; and automatically reordering the known expressions of the ordered list based at least in part on matches between the expressions and the known expressions.

According to various embodiments of the invention, the comparing is performed by a computer processor.

According to various embodiments of the invention, the ordered list is stored in a memory.

According to various embodiments of the invention, the ordered list is a database.

According to various embodiments of the invention, the plurality of expressions are associated with network events.

According to various embodiments of the invention, the known expressions are reordered based on an amount of times each known expression is matched.

According to various embodiments of the invention, the known expressions are reordered based on an amount of times each known expression is matched during a predetermined period of time.

According to various embodiments of the invention, the data is logged data.

According to various embodiments of the invention, the data is a data stream.

According to various embodiments of the invention, the known expressions are reordered each time an expression is matched.

According to various embodiments of the invention, the known expressions are reordered each time an expression is matched such that the matched known expression becomes the first known expression.

According to various embodiments of the invention, the ordered list is only reordered when the parser is in a learning mode.

According to various embodiments of the invention, the parser is put in the learning mode based on a level of parsing activity.

According to various embodiments of the invention, the known expressions are reordered after a predetermined number of expressions are matched.

According to various embodiments of the invention, the known expressions are reordered after a predetermined number of default matches have occurred.

According to various embodiments of the invention, the known expressions are reordered when a rate of dataflow drops below a predetermine threshold.

According to various embodiments of the invention, the known expressions are reordered when a rate of dataflow exceeds a predetermine threshold.

According to various embodiments of the invention, the ordered list comprises a plurality of reorder groups, each reorder group comprising at least one known expression, wherein the known expressions are reordered within each of the reorder groups and the reorder groups remain in a fixed order.

According to various embodiments of the invention, the ordered list comprises a plurality of reorder groups, each reorder group comprising at least one known expression, wherein the reorder groups are reordered and the known expressions remain in a fixed order within each of the reorder groups.

According to various embodiments of the invention, at least one of the known expressions is prevented from being reordered.

According to various embodiments of the invention, a machine readable storage may store thereon a computer program for a parser, the computer program comprising a routine set of instructions which when executed by the machine can cause the machine to: receive data at a parsing unit, wherein the data stream comprises a plurality of expressions; compare at least one of the expressions in the data to at least one of a plurality of known expressions stored in an ordered list, wherein the at least one expression is compared to a first known expression in the ordered list and, if the at least one expression does not match the first known expression, the at least one expression is compared to subsequent known expressions in the order in which they are stored in the ordered list until the at least one expression is matched to a known expression, or until it is determined that the at least one expression does not match any of the known expressions; and automatically reorder the known expressions of the ordered list based at least in part on matches between the expressions and the known expressions.

According to various embodiments of the invention, a computer processor is used to compare the expression to at least one of the plurality of known expressions stored in the ordered list.

According to various embodiments of the invention, the data is logged data.

According to various embodiments of the invention, the data is a data stream.

According to various embodiments of the invention, a computer system may monitor data for network events, the system comprising: a receiving unit to receive data comprising a plurality of expressions from at least one networked source; and a parsing unit to parse the data, the parsing unit comprising, an ordered list comprising a plurality of known expressions, a comparison unit to compare the expressions in the data with the known expressions to identify occurrences where the expressions match the known expressions, such that at least one of the expressions is compared to a first known expressions and, if the expression does not match the first known expression, the expression is then to be compared to subsequent known expressions in an order according to the ordered list, until it is determined that the expression matches one of the known expressions, or until it is determined that the expression does not match any of the known expressions, and a reordering unit to automatically reorder the known expressions in the ordered list according to matches between the expressions and the known expressions.

According to various embodiments of the invention, the ordered list is to be stored in a memory.

According to various embodiments of the invention, the known expressions are to be reordered based on an amount of times each known expression is matched.

According to various embodiments of the invention, the known expressions are to be reordered based on an amount of times each known expression is matched during a predetermined period of time.

According to various embodiments of the invention, the data is logged data.

According to various embodiments of the invention, the data is a data stream.

According to various embodiments of the invention, the known expressions are to be reordered each time an expression is matched.

According to various embodiments of the invention, the known expressions are to be reordered each time an expression is matched such that the matched known expression becomes the first known expression.

According to various embodiments of the invention, the ordered list is only to be reordered when the parser is in a learning mode.

According to various embodiments of the invention, the parser is to be put in the learning mode based on a level of parsing activity.

According to various embodiments of the invention, the known expressions are to be reordered after a predetermined number of expressions are matched.

According to various embodiments of the invention, the known expressions are to be reordered when a rate of dataflow drops below a predetermine threshold.

According to various embodiments of the invention, the ordered list comprises a plurality of reorder groups, each reorder group comprising at least one known expression, wherein the known expressions are to be reordered within each of the reorder groups and the reorder groups are to remain in a fixed order.

According to various embodiments of the invention, the ordered list comprises a plurality of reorder groups, each reorder group comprising at least one known expression, wherein the reorder groups are to be reordered and the known expressions are to remain in a fixed order within each of the reorder groups.

According to various embodiments of the invention, at least one of the known expressions is to be prevented from being reordered.

According to various embodiments of the invention, the networked source is a networked device.

According to various embodiments of the invention, the grammar is automatically reordered based at least in part on matches between known expressions and expressions input into the event parser.

According to various embodiments of the invention, the grammar is reordered based on an amount of times each known expression is matched.

According to various embodiments of the invention, the grammar is reordered based on an amount of times each known expression is matched during a predetermined period of time.

According to various embodiments of the invention, the grammar is reordered each time an expression is matched.

According to various embodiments of the invention, the grammar is only reordered when the event parser is in a learning mode.

According to various embodiments of the invention, the event parser is put in the learning mode based on a level of parsing activity.

According to various embodiments of the invention, the grammar is reordered after a predetermined number of expressions are matched.

According to various embodiments of the invention, the grammar is reordered when a rate of dataflow drops below a predetermine threshold.

According to various embodiments of the invention, the grammar is reordered when a rate of dataflow exceeds a predetermine threshold.

According to various embodiments of the invention, the grammar comprises a plurality of reorder groups, each reorder group comprising at least one known expression, wherein the known expressions are reordered within each of the reorder groups and the reorder groups remain in a fixed order.

According to various embodiments of the invention, the grammar comprises a plurality of reorder groups, each reorder group comprising at least one known expression, wherein the reorder groups are reordered and the known expressions remain in a fixed order within each of the reorder groups.

According to various embodiments of the invention, at least a portion of the grammar is prevented from being reordered.

According to various embodiments of the invention, a method for reordering grammar in a grammar based event parser may include automatically reordering the grammar based at least in part on matches between determined expressions and known expressions.

According to various embodiments of the invention, a grammar based event parser may include a reordering unit to automatically reorder grammar based at least in part on matches between determined expressions and known expressions.

BRIEF DESCRIPTION OF THE DRAWINGS

Figure 1:
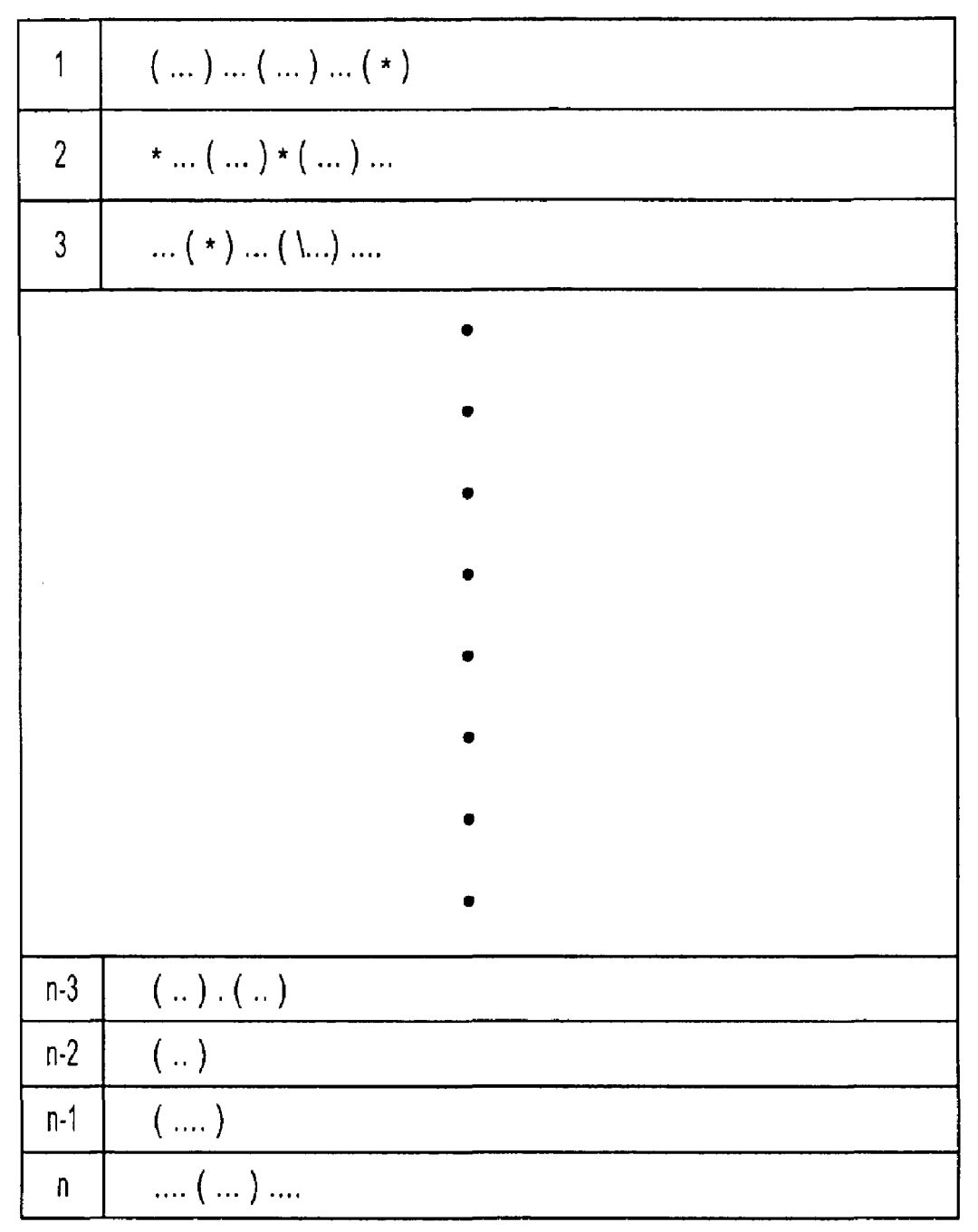

FIG. 1 depicts an example of a parse grammar as previously known in the art;

FIGS. 3A through 3C depict an example of a count based adaptive parser reordering expressions based on number of matches to each event;

FIG. 4 depicts an example of a table used to assign expressions to reorder groups;

FIG. 5 depicts an example of a scheme utilizing windowed ordering;

DETAILED DESCRIPTION OF THE INVENTION

Figure 2A:
FIGS. 2A through 2C depict an example of an adaptive parser in which the events are reordered following a match.

An adaptive parser has been developed to solve at least the problems noted above. The adaptive parser is capable of automatically reordering expressions such that more commonly matched expressions are tested earlier than less commonly matched expressions. By reordering the expressions in this manner, less frequently matched expressions are less frequently tested (and are often not tested at all) thereby lowering the overall number of tests and increasing the amount of data that can be parsed in a given time period.

One embodiment of the adaptive parser is a self-learning system that uses a regular expression based grammar wherein the expressions are initially manually ordered staring with more specific rules and progressing to more generic rules. Following the initial ordering, the order of the expressions can be changed based on the frequency of use of each particular expression.

One way to utilize such a system could involve placing the adaptive parser in a learning mode to allow the adaptive parser to re-order the expressions according to the data flow pattern of the environment in which the parser is deployed. Once the appropriate ordering has been established the adaptive parser can be placed in a normal operational mode in which it will perform at an increased rate compared to the manually configured parser.

The length of time that the adaptive parser is placed in a learning mode can be determined by a number of factors. For example, the adaptive parser could be placed in the learning mode for a predetermined amount of time, wherein the time could be determined as a function of data flow or of the number of expressions used in the parser. In an alternative embodiment, the adaptive parser could be placed in the learning mode until a predetermined number of expressions have been reordered. In a further embodiment the adaptive parser could be placed in the learning mode until only a given number of expressions are reordered in a specified period of time, this can be used as an indicator the expressions are properly ordered. In yet another embodiment, the adaptive parser could be continuously operated in the learning mode such that the adaptive parser continuously alters the order of the expressions. In yet another embodiment, the adaptive parser could be placed in learning mode at a set time to allow the reordering of expressions when the data flow is projected to be at a minimum. In a further embodiment, the adaptive parser can be put in a learning mode whenever the rate of dataflow drops below a certain threshold, thus allowing the reordering of expression when it may have a minimal impact on the speed of the adaptive parser. In a further embodiment, the adaptive parser may be placed in learning mode when the speed at which the parser is parsing the data falls below a threshold speed. While some embodiments may only place the adaptive parser in a learning mode one time, other embodiments may allow for multiple switching into a learning mode based on predetermined criteria.

In another embodiment, an adaptive parser may be programmed to switch into a learning mode if a certain percentage of coarse (or lesser) grained expressions are matched a certain number of times in a specified time window. Alternatively, the parser may be programmed to switch into a learning mode whenever a generic expression, or set of generic expressions, is matched a certain number of times.

Figure 4:
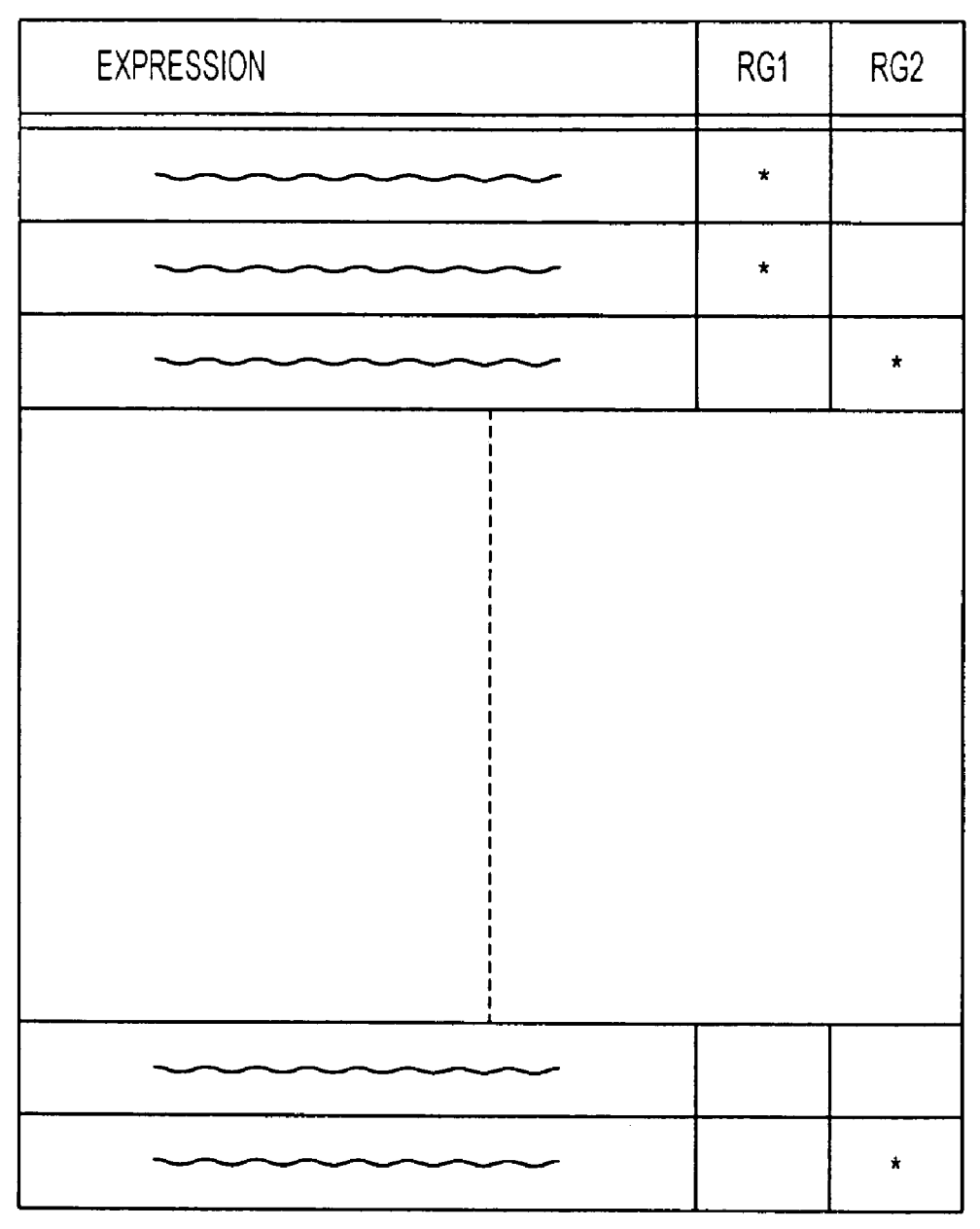

In another embodiment, it may be determined that only certain expressions should be reordered. This may be the case if certain high priority expressions should be recognized as early in the process as possible. In such embodiments, reorder groups can be used, where a reorder group is a set of expressions which can be safely reordered with respect to one another. In various embodiments, different numbers of reorder groups can be used. For example, a user may wish to allow only certain expressions present in a parser to be reordered and will be able to accomplish this by putting those expressions in a reorder group while leaving the other expressions out of the reorder group such that they will remain in the order in which they have been manually configured. FIG. 4 shows an example of a chart that may be used to assign expressions to reorder groups by flagging the expressions.

In alternate embodiments, an adaptive parser may be configured to have multiple reorder groups such that the reorder groups are configured to be in a fixed order but the individual expressions in each of the reorder groups may be dynamically adapted by the adaptive parser. In a further embodiment, reorder groups may be used in which the expressions in each group remain fixed with respect to one another, but the order of the groups themselves is changed based on the number of matches to expressions within the groups. A further embodiment may utilize reorder groups in which both the expressions within the groups and the groups themselves may be reordered.

In another embodiment, a user may select which expressions are placed into reorder groups by manipulating a flag attached to each expression. In one embodiment, reorder groups can be created by setting a Can Reorder flag on a set of adjacent Breaking regular expressions, wherein the flag is ignored if it is applied to a non-Breaking regular expression. In a further embodiment, a flag may be set to indicate which of the reorder groups the expression should be associated with. In an exemplary embodiment of the invention, the term breaking expression may be used to define an expression in which a program breaks out of a current set of conditionals when a certain criteria is met instead of continuing through the conditionals, however, it is not necessary to so limit the term.

In a preferred embodiment no two regular expressions in the set exactly match the same input. Accordingly, this embodiment avoids confusion that may result in trying to determine the ordering logic of the expressions. Additionally, it prevents the occurrence of duplicate expressions in the parse hierarchy.

Figure 2B:
Figure 2C:

In order to improve the efficiency of the adaptive parser, an adaptive reordering algorithm can be used. In one embodiment, the algorithm determines when a reorderable expression (that is, an expression in a reorder group that is subject to reordering) matches an event. When such a match is determined, the reorderable expression is moved to the top of its reorder group. This embodiment of the adaptive reordering algorithm has an advantage in that it is simple and it is capable of responding rapidly to changes in the types of log data being examined. This may be preferred if the data analyzed is grouped together in such a way that similar events are grouped together, for example. FIGS. 2A through 2C show an example of an embodiment using such an adaptive algorithm. FIG. 2A shows a manually configured hierarchical list of expressions prior to operation of the parser. Following a match to the expression numbered k in FIG. 2A, the adaptive parser reorders the list as shown in FIG. 2B such that the former expression k is now at the top of the list as expression number 1. Similarly, following a match of expression L, the adaptive parser again reorders the list as shown in FIG. 2C such that the former expression L is now at the top of the list, moving down the former expression 1.

Alternate embodiments utilize weight/count based algorithms. In an example of a count based algorithm, the algorithm counts the number of times that each reorderable expression matches an event and then reorders the expressions such that the most frequently matched reorderable expressions are at the top of their respective reorder groups. Using a count based algorithm may be preferable when used with purely random distributions of data. However, count based algorithms may not be preferred when used with data that is grouped in similar clusters as count based algorithms may be slower to react to the changes. An example of a hierarchical list of expressions being reordered by a count based system is shown in FIGS. 3A and B. FIG. 3A shows a list of expressions and the number of times those expressions have been matched in a previously occurring time period. For example, expression 1 has been matched 3 times while expression L was matched 38 times. FIG. 3B shows the results of reordering the expressions such that they are positioned with the expressions having previously received the highest number of matches at the top of the list and those that received the lowest number of matches are placed at the bottom of the list. FIG. 3C shows the reordered list with the previous counts cleared. In an additional embodiment, weights may be based on the mean and/or median evaluation time of an expression. In a further embodiment, the weights may also be determined based on the mean/median time and the frequency of matching, such that the ordering may be based on expected cost.

In an alternate embodiment, more complex algorithms may be used. Such algorithms may include a count based component, similar to that described above, combined with a timing component such that expressions are reordered based not only on the number of matches, but also on the recent frequency of the matches such that an expression with the highest number of matches may be ordered below an expression with fewer matches if the expression with fewer matches was matched more often in a recent period of time. In alternate embodiments, the amount of data analyzed may be used instead of time to determine the recent frequency of matches. In another type of count based embodiment, each expression may be assigned a value that is based on the number of times it has been matched but the value can also be regularly reduced after a period of time has elapsed. Using such an embodiment will advance the expressions that are currently being matched while lowering the priority of expressions that are not currently being matched as frequently while still giving weight to the overall number of matches to each expression.

Further alternate embodiments may use a windowing or another scheme. In an exemplary embodiment using a windowing scheme, counts could be limited to those occurring only during a determined time window. The counting and ordering could be done at the leading edge of the time window, and the ordering may remain in effect until the end of the time window, after which the ordering could be discarded and a new order could be established. An example of such a windowing scheme is shown in FIG. 5. In a further embodiment, the order for a set of windows could be stored and re-used when a message pattern is again recognized. In some cases message patterns have the same, or substantially similar, overall distribution on any given day; however, the patterns may differ during certain periods within these days. An embodiment of the invention using the windowing approach may be preferred here, as the ordering would automatically change from window to window, once the system has learned the order for a specific window.

One concern that may exist from excessive reordering is the possibility of thrashing. In an embodiment designed to reduce the possibility of thrashing, group based reordering is used. In group based reordering, groups of expressions that may be determined to be likely to be related to similar data types may be formed. These groups of expressions can then be reordered using algorithms similar to those discussed above. In a count based embodiment, this can result in higher count groups being ordered near the top and lower count and generic groups being ordered at the bottom of the parse grammar.

In a further embodiment, individual expressions can be moved out of their assigned groups and/or into other groups based on their individual instances of matching. By reordering the expressions into more stable groups, these embodiments allow for a settling of their parse trees, thereby reducing thrashing that may occur as a result of excessive reordering.

Figure 6:
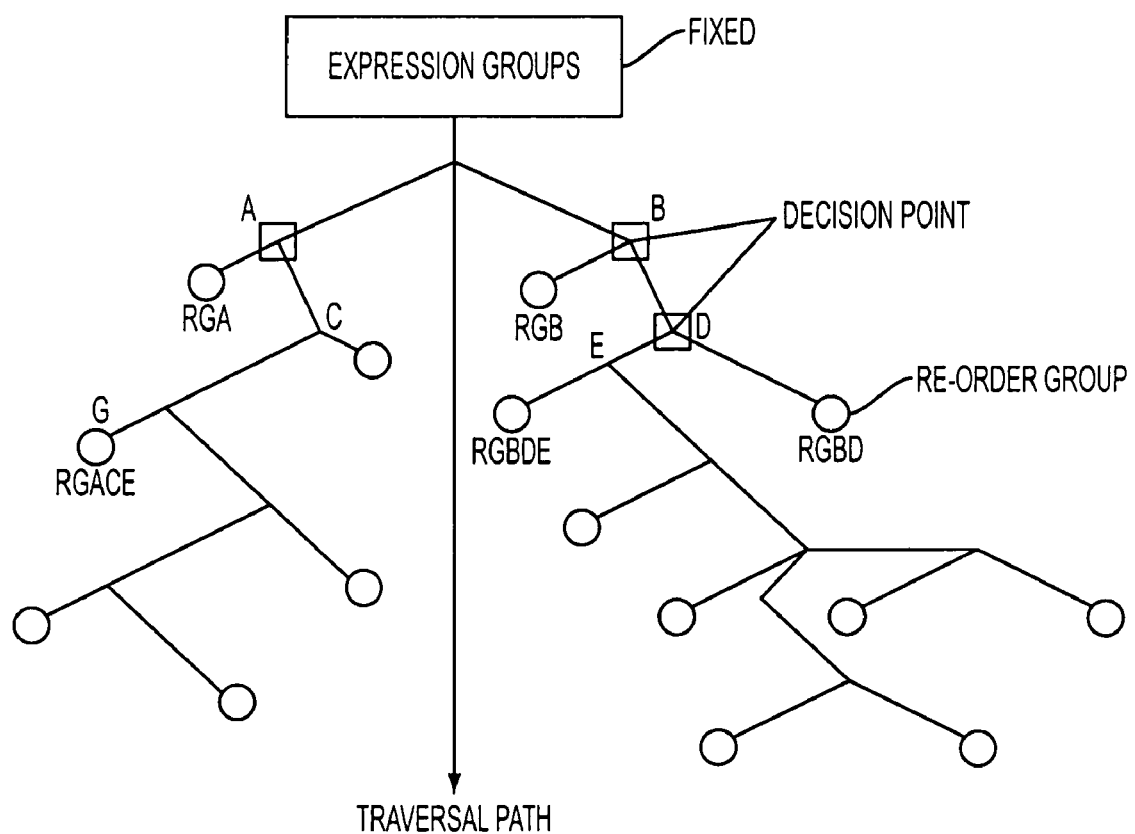
FIG. 6 depicts an example of a scheme utilizing tree based reordering.

In another embodiment of the invention, the system can be programmed to identify and/or store specific reoccurring patterns and an associated ordering tree that can be optimized for that particular pattern. Accordingly, when a series of reoccurring patterns is recognized, the system can then analyze data using the associated ordering tree. In further embodiments of the invention a tree having a plurality of ordering branches can be used to analyze the data. An example of such a tree is shown in FIG. 6.

While the invention has been explained through the use of specific embodiments, these embodiments are not used to limit the scope of the invention.

The following definitions may be used to help understand various embodiments of the invention. These definitions are not intended to limit the scope of the claims, and are therefore not to be interpreted as restricting the above described embodiments.

Event Driven Parser: An event driven parser may be one in which a relationship between a host program and a parser is turned inside out. In a conventional parser, the host program may call the parser; the parser may then analyze the complete input text and return to the host program only when it has finished with the entire input. In an event driven parser however, the parser does may not read its input directly from a file or from memory. Instead, the host program may, after initializing the parser, call it once for each input token. Each time the parser is called; it may update its state appropriately, call reduction procedures and, when it needs more input, return to the host program. The effect is that parsing can occur in parallel with other processing performed by the host program. This technique is especially useful in situations where a token stream to be parsed is developed on the fly, as when using lexical scanners, for instance.

Grammar: Traditionally, a grammar is a set of productions which, when taken together, specify precisely a set of acceptable input sequences in terms of an abstract set of terminal tokens. The set of acceptable input sequences is often called the "language" defined by the grammar.

Grammar Rule: A "grammar rule" may include a sequence of rule elements. Each rule element may identify a token, such as a terminal token or nonterminal token. The token may be "matched" by a corresponding sequence of tokens in the input stream to the parser.

Grammar Token: A grammar token may be a token which represents a "top level" of a grammar, and may describe a complete input to a parser.

Parser: A parser may be a program, a procedure within a program, or an apparatus which may scan a sequence of input characters or input tokens and accumulate them in an input buffer or stack as determined by a set of productions which constitute a grammar. When the parser discovers a sequence of tokens as defined by a grammar rule, it may reduce the sequence to a single reduction token. This nonterminal token may now replace the tokens which matched the grammar rule and the search for matches may continue. If an input token is encountered which will not yield a match for any rule, it may be considered a syntax error and some kind of error recovery may be performed before continuing. If a match, or reduction action, yields a grammar token, the parser may returns to a procedure which may have called it.

Parsing Engine: A parser may include of three basic components: a set of syntax tables, a set of reduction procedures and a parsing engine. The parsing engine may be a body of code that interprets a parsing table, invokes input functions, and calls reduction procedures. A parsing engine may be a simple automation, characterized by a set of states and a set of inputs. The inputs may be tokens of a grammar.

Semantic Action: A semantic action may be a piece of code that is executed when a grammar rule has been identified by a parser. Semantic actions may also be called reduction procedures, since they are executed when a grammar rule is reduced to a token.

Semantic Value: Tokens, whether terminal or nonterminal, may have a semantic value. In the case of terminal tokens, this may be a value assigned by a lexical scanner or, if the parser is using direct character input, it may be the ASCII value of the character itself. The values of nonterminal tokens may be created by reduction procedures. As a parse progresses, token values may be shifted onto a stack, such that in a reduction procedure, the values of the tokens that comprise the grammar rule that is being reduced may be available for inspection.

Token: Tokens, such as terminal tokens or nonterminal tokens, may be thought of as the playing pieces of a parser. The grouping of tokens into more complex tokens is governed by the grammar rules, or productions in a grammar. Tokens may be denoted by token names, by virtual productions, by immediate actions, by explicit character representations, or by expressions which yield character sets. Tokens used in a grammar may be abstract. The tokens identified by a parser may be concrete instances of the abstract tokens in the grammar. The word "token", in any particular context, may refer directly to either an abstract token, or a concrete instance of an abstract token, or may refer only indirectly to the token by means of a token name or token number.

We claim:

1. A method of parsing data, the method comprising:
receiving the data at a parsing unit executed by a computer processor, wherein the data comprises a plurality of expressions;
comparing by the parsing unit at least one of the expressions in the data to at least one of a plurality of known expressions stored in an ordered list, wherein the at least one expression is compared to a first known expression in the ordered list and, if the at least one expression does not match the first known expression, the at least one expression is compared to subsequent known expressions in an order in which they are stored in the ordered list until the at least one expression is matched to a known expression, or until it is determined that the at least one expression does not match any of the known expressions; and
automatically reordering by the parsing unit the known expressions of the ordered list based at least in part on matches between the expressions and the known expressions.

2. The method of claim 1, wherein the ordered list is stored in a memory.

3. The method of claim 1, wherein the ordered list is a database.

4. The method of claim 1, wherein the plurality of expressions are associated with network events.

5. The method of claim 1, wherein the known expressions are reordered based on an amount of times each known expression is matched.

6. The method of claim 1, wherein the known expressions are reordered based on an amount of times each known expression is matched during a predetermined period of time.

7. The method of claim 1, wherein the data is logged data.

8. The method of claim 1, wherein the data is a data stream.

9. The method of claim 1, wherein the known expressions are reordered each time an expression is matched.

10. The method of claim 9, wherein the known expressions are reordered each time an expression is matched such that the matched known expression becomes the first known expression.

11. The method of claim 1, wherein the ordered list is only reordered when the parser is in a learning mode.

12. The method of claim 11, wherein the parser is put in the learning mode based on a level of parsing activity.

13. The method of claim 1, wherein the known expressions are reordered after a predetermined number of expressions are matched.

14. The method of claim 1, wherein the known expressions are reordered when a rate of dataflow drops below a predetermine threshold.

15. The method of claim 1, wherein the known expressions are reordered when a rate of dataflow exceeds a predetermine threshold.

16. The method of claim 1, wherein the ordered list comprises a plurality of reorder groups, each reorder group comprising at least one known expression, wherein the known expressions are reordered within each of the reorder groups and the reorder groups remain in a fixed order.

17. The method of claim 1, wherein the ordered list comprises a plurality of reorder groups, each reorder group comprising at least one known expression, wherein the reorder groups are reordered and the known expressions remain in a fixed order within each of the reorder groups.

18. The method of claim 1, wherein at least one of the known expressions is prevented from being reordered.

19. A machine readable storage having stored thereon a computer program for a parser, the computer program comprising a routine set of instructions which when executed by the machine can cause the machine to:
   receive data at a parsing unit, wherein the data stream comprises a plurality of expressions;
   compare at least one of the expressions in the data to at least one of a plurality of known expressions stored in an ordered list, wherein the at least one expression is compared to a first known expression in the ordered list and, if the at least one expression does not match the first known expression, the at least one expression is compared to subsequent known expressions in the order in which they are stored in the ordered list until the at least one expression is matched to a known expression, or until it is determined that the at least one expression does not match any of the known expressions; and
   automatically reorder the known expressions of the ordered list based at least in part on matches between the expressions and the known expressions.

20. The method of claim 19, wherein a computer processor is used to compare the expression to at least one of the plurality of known expressions stored in the ordered list.

21. The method of claim 19, wherein the data is logged data.

22. The method of claim 19, wherein the data is a data stream.

23. A computer system to monitor data for network events, the system comprising:
   a receiving unit executed by a computer processor to receive data comprising a plurality of expressions from at least one networked source; and
   a parsing unit executed by a computer processor to parse the data, the parsing unit comprising,
   an ordered list comprising a plurality of known expressions,
   a comparison unit executed by a computer processor to compare the expressions in the data with the known expressions to identify occurrences where the expressions match the known expressions, such that at least one of the expressions is compared to a first known expression and, if the expression does not match the first known expression, the expression is then to be compared to subsequent known expressions in an order according to the ordered list, until it is determined that the expression matches one of the known expressions, or until it is determined that the expression does not match any of the known expressions, and
   a reordering unit executed by a computer processor to automatically reorder the known expressions in the ordered list according to matches between the expressions and the known expressions.

24. The method of claim 23, wherein the ordered list is to be stored in a memory.

25. The method of claim 23, wherein the known expressions are to be reordered based on an amount of times each known expression is matched.

26. The method of claim 23, wherein the known expressions are to be reordered based on an amount of times each known expression is matched during a predetermined period of time.

27. The method of claim 23, wherein the data is logged data.

28. The method of claim 23, wherein the data is a data stream.

29. The method of claim 23, wherein the known expressions are to be reordered each time an expression is matched.

30. The method of claim 29, wherein the known expressions are to be reordered each time an expression is matched such that the matched known expression becomes the first known expression.

31. The method of claim 23, wherein the ordered list is only to be reordered when the parser is in a learning mode.

32. The method of claim 31, wherein the parser is to be put in the learning mode based on a level of parsing activity.

33. The method of claim 23, wherein the known expressions are to be reordered after a predetermined number of expressions are matched.

34. The method of claim 23, wherein the known expressions are to be reordered when a rate of dataflow drops below a predetermine threshold.

35. The method of claim 23, wherein the ordered list comprises a plurality of reorder groups, each reorder group comprising at least one known expression, wherein the known expressions are to be reordered within each of the reorder groups and the reorder groups are to remain in a fixed order.

36. The method of claim 23, wherein the ordered list comprises a plurality of reorder groups, each reorder group comprising at least one known expression, wherein the reorder groups are to be reordered and the known expressions are to remain in a fixed order within each of the reorder groups.

37. The method of claim 23, wherein at least one of the known expressions is to be prevented from being reordered.

38. The method of claim 23, wherein the networked source is a networked device.

39. A computer-implemented grammar based event parser, comprising:
   a receiving unit executed by a computer processor to receive data comprising expressions from at least one networked source; and
   a parsing unit executed by a computer processor to parse the data based on a grammar comprising known expressions, wherein the grammar is automatically reordered based at least in part on matches between the known expressions and the expressions received by the receiving unit.

40. The event parser of claim 39, wherein the grammar is reordered based on an amount of times each known expression is matched.

41. The event parser of claim 39, wherein the grammar is reordered based on an amount of times each known expression is matched during a predetermined period of time.

42. The event parser of claim 39, wherein the grammar is reordered each time an expression is matched.

43. The event parser of claim 39, wherein the grammar is only reordered when the event parser is in a learning mode.

44. The event parser of claim 43, wherein the event parser is put in the learning mode based on a level of parsing activity.

45. The event parser of claim 39, wherein the grammar is reordered after a predetermined number of expressions are matched.

46. The event parser of claim 39, wherein the grammar is reordered when a rate of dataflow drops below a predetermine threshold.

47. The event parser of claim 39, wherein the grammar is reordered when a rate of dataflow exceeds a predetermine threshold.

48. The event parser of claim 39, wherein the grammar comprises a plurality of reorder groups, each reorder group comprising at least one known expression, wherein the known expressions are reordered within each of the reorder groups and the reorder groups remain in a fixed order.

49. The event parser of claim 39, wherein the grammar comprises a plurality of reorder groups, each reorder group comprising at least one known expression, wherein the reorder groups are reordered and the known expressions remain in a fixed order within each of the reorder groups.

50. The event parser of claim 39, wherein at least a portion of the grammar is prevented from being reordered.

51. A method for reordering grammar in a grammar based event parser, comprising:
    receiving by a receiving unit executed by a computer processor data comprising expressions; and
    parsing by a parsing unit executed by a computer processor the data based on a grammar comprising known expressions, the parsing comprising automatically reordering the grammar based at least in part on matches between the known expressions and the expressions received by the receiving unit.

52. A computer-implemented grammar based event parser, comprising:
    a receiving unit executed by a computer processor to receive data comprising expressions from at least one networked source; and
    a parsing unit executed by a computer processor to parse the data based on a grammar comprising known expressions, and to automatically reorder determined groups of the known expressions of the grammar based at least in part on matches between the known expressions and the expressions received by the receiving unit.

53. The method of claim 1, wherein the known expressions are reordered after a predetermined number of default matches have occurred.

* * * * *